(No Model.)

W. JONES.
VARIABLE CAM.

No. 284,860. Patented Sept. 11, 1883.

WITNESSES:
Harry L. Ashenfelter
James F. Tobin

INVENTOR:
Washington Jones
by his Attorneys
Howson & Sons

N. PETERS, Photo-Lithographer, Washington, D. C.

UNITED STATES PATENT OFFICE.

WASHINGTON JONES, OF PHILADELPHIA, PENNSYLVANIA.

VARIABLE CAM.

SPECIFICATION forming part of Letters Patent No. 284,860, dated September 11, 1883.

Application filed July 12, 1883. (No model.)

*To all whom it may concern:*

Be it known that I, WASHINGTON JONES, a citizen of the United States, and a resident of Philadelphia, Pennsylvania, have invented certain Improvements in Variable Cams, of which the following is a specification.

My invention consists of a cam constructed and combined with mechanism, substantially as described hereinafter, so that the circumferential extent of the swell of the cam may be varied at pleasure.

Figure 1:
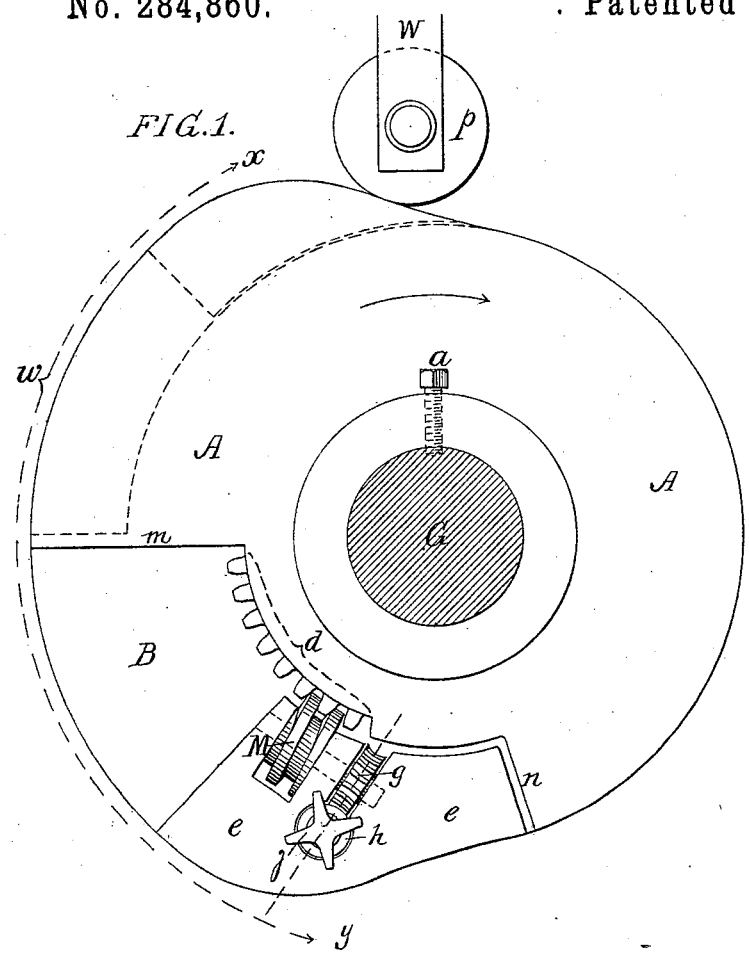
Figure 2:
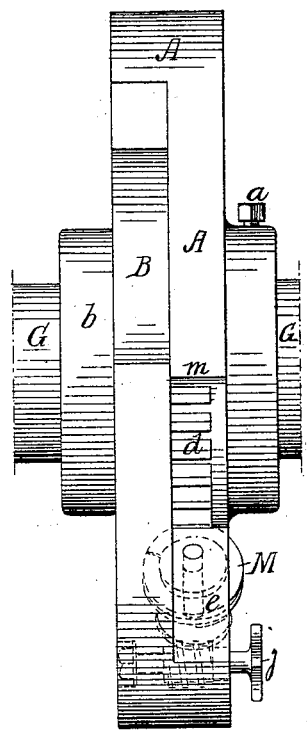
Figure 3:
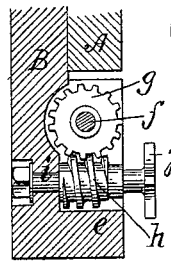

In the accompanying drawings, Figure 1 is a side view of a variable cam made in accordance with my invention; Fig. 2, an edge view; Fig. 3, a section on the line 1 2, Fig. 1; and Figs. 4 and 5, perspective views of the two portions of the cam.

The cam is composed of the two plates A and B, the plate A being secured to the shaft G, in the present instance by a set-screw, a, passing through the hub of the plate, and the plate B being circumferentially adjustable on the shaft and maintained in contact with the plate A by a collar, b, on the said shaft. The projecting portion w of the cam between the points x and y, this portion being sometimes termed the "swell" of the cam, is partly on the plate A and partly on the plate B; and the object of my invention is to increase or diminish the circumferential extent of this swell by the adjustment of one of the plates so that the cam may have a longer or shorter dwell on the roller p or other object which the cam has to actuate.

Figure 5:
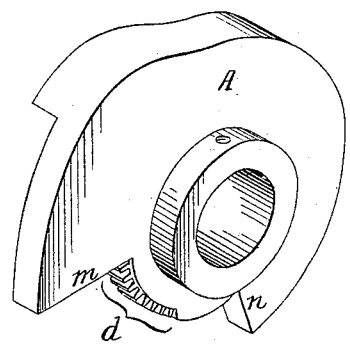

It will be seen on reference to Fig. 5 that a portion of the plate A is cut away, so as to leave two abrupt shoulders, m n, between which a toothed segment, d, concentric with the shaft, is formed on the plate. On the other plate, B, is a projection, e, in which are bearings for a small spindle, f, carrying a worm, M, which gears into the teeth of the segment d of the plate. When the worm is turned in one direction, the swell w of the cam will be diminished circumferentially in extent, and it will be increased in extent when the worm is turned in a contrary direction. The spindle f carries a worm-wheel, g, into which gears a worm, h, on a spindle, i, having its bearing in the plate B, the outer end of this spindle being preferably furnished with a star-wheel, j, the turning of which will necessarily result either in the circumferential contraction or extension of the swell of the cam, according to the direction in which the star-wheel is turned.

Figure 4:
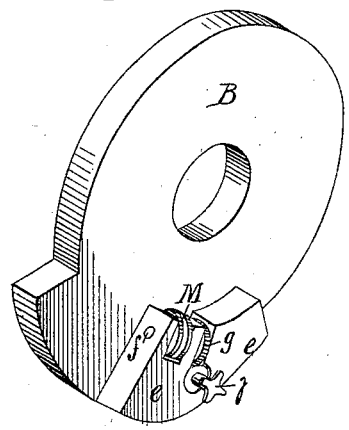

The plate A is recessed at the back for receiving a portion of the plate B, as will be understood by reference to the perspective views, Figs. 4 and 5.

The edge of the swell cannot of course be of uniform width, for it is composed partly of a projecting portion of the plate A, the thickness of which is shown in Fig. 2, partly of that portion of the plate B where the projection e occurs, and the thickness of which (also shown in Fig. 2) is the same as that of the last-named portion, and partly of the thin portion of the plate B, which always forms a bridge between the thick portion of the swell on the plate A and the thick portion of the swell on the plate B. In other words, the swell of the cam has the same continuity as a solid cam of uniform thickness. It will be understood, however, that to insure a proper continuity the roller p, or other object against which the cam has to act, must be as wide as the thickest part of the swell of the cam.

While devices other than the system of worms and worm-wheels might be employed to adjust the plate B, these appliances are preferred, as they not only serve as mediums for adjustment, but also as locking devices for retaining the plate B of the cam in the position to which it has been adjusted. The adjustment, moreover, can be effected while the cam is in motion by simply applying a suitable instrument to the star-wheel.

The cam is especially applicable to steam-engines as a cut-off cam. W, for instance, may be the valve-lifting rod of a steam-engine, the said rod carrying at its lower end the above-mentioned roller p; but the cam may also be used in many other connections, wherever a change in the duration of its dwell is desirable.

I claim as my invention—

1. A cam composed of two plates, one circumferentially adjustable in respect to the other, in combination with mechanism, substantially as described, for effecting this adjustment, and thereby increasing or diminishing the circumferential extent of the swell of the cam.

2. The combination of the two plates A and

B of the cam, with a toothed segment on one plate and a spindle carrying a worm-wheel on the other plate, substantially as set forth.

3. The combination of the plate A of the cam and its toothed segment $d$ with the plate B, its spindle $f$, carrying the worm M and worm-wheel $g$, and the spindle $i$ and worm $h$, all substantially as described.

In testimony whereof I have signed my name to this specification in the presence of two subscribing witnesses.

WASHINGTON JONES.

Witnesses:
HARRY L. ASHENFELTER,
HARRY SMITH.